United States Patent
Jang et al.

(10) Patent No.: US 12,251,926 B2
(45) Date of Patent: Mar. 18, 2025

(54) METASTRUCTURE HAVING ZERO ELASTIC MODULUS ZONE AND METHOD FOR DESIGNING METASTRUCTURE HAVING ZERO ELASTIC MODULUS ZONE

(71) Applicant: CENTER FOR ADVANCED META-MATERIALS, Daejeon (KR)

(72) Inventors: Bong Kyun Jang, Daejeon (KR); Jae Hyun Kim, Daejeon (KR); Se Jeong Won, Daejeon (KR); Hak Joo Lee, Daejeon (KR); Seung Mo Lee, Nonsan-si (KR); Kwang Seop Kim, Daejeon (KR)

(73) Assignee: CENTER FOR ADVANCED META-MATERIALS, Daejeon (KR)

( * ) Notice: Subject to any disclaimer, the term of this patent is extended or adjusted under 35 U.S.C. 154(b) by 172 days.

(21) Appl. No.: 18/083,592

(22) Filed: Dec. 19, 2022

(65) Prior Publication Data
US 2023/0116960 A1   Apr. 20, 2023

Related U.S. Application Data

(63) Continuation of application No. PCT/KR2020/008522, filed on Jun. 30, 2020.

(51) Int. Cl.
*B41F 16/02*     (2006.01)
*B41F 16/00*     (2006.01)
*F16F 1/00*      (2006.01)

(52) U.S. Cl.
CPC .............. *B41F 16/002* (2013.01); *F16F 1/00* (2013.01); *F16F 2228/066* (2013.01)

(58) Field of Classification Search
CPC . B41F 16/002; B41F 16/00; F16F 1/00; F16F 2228/066; F16F 2228/063; A61G 7/05715
See application file for complete search history.

(56) References Cited

U.S. PATENT DOCUMENTS

2013/0008769 A1     1/2013  Baugher
2015/0204413 A1*    7/2015  Churchill ................ F16F 13/28
                                                              248/550

FOREIGN PATENT DOCUMENTS

CN      105960546 B     8/2018
JP      2014-010290 A   1/2014
(Continued)

OTHER PUBLICATIONS

Saeid Loghavi, Analysis of Negative Stiffness Devices with Application to Vehicle Seat Suspensions, Apr. 2015, obtained from https://kb.osu.edu/server/api/core/bitstreams/b71e8465-83eb-54c5-87bb-72222631f361/content (Year: 2015).*
(Continued)

*Primary Examiner* — Brian Handville
(74) *Attorney, Agent, or Firm* — Revolution IP, PLLC

(57) ABSTRACT

Disclosed herein are a metastructure having a zero elastic modulus zone, which can experience constant stress in a predetermined strain zone, and a method for designing the same. The metastructure includes a first unit and a second unit, wherein the first unit has a structure capable of buckling and has a stress-strain relation having a zone corresponding to a negative elastic modulus, the second unit is disposed adjacent to the first unit and has a stress-strain relation having a zone corresponding to a positive elastic modulus, and the metastructure has zero elastic modulus in a predetermined target strain zone through synthesis of the negative elastic modulus of the first unit with the positive elastic modulus of the second unit.

7 Claims, 9 Drawing Sheets

(56) References Cited

FOREIGN PATENT DOCUMENTS

| KR | 10-2013-0027182 A | 3/2013 |
| KR | 10-2019-0063454 A | 6/2019 |
| KR | 10-2020-0142686 A | 12/2020 |

OTHER PUBLICATIONS

International Search Report of PCT/KR2020/008522 mailed Mar. 11, 2021.

* cited by examiner (a)

(b)

METASTRUCTURE HAVING ZERO ELASTIC MODULUS ZONE AND METHOD FOR DESIGNING METASTRUCTURE HAVING ZERO ELASTIC MODULUS ZONE

TECHNICAL FIELD

The present invention relates to a metastructure having a zero elastic modulus zone and a method for designing the same and, more particularly, to a metastructure having a zero elastic modulus zone, which can experience constant stress in a predetermined strain zone, and a method for designing the same.

BACKGROUND ART

There are various applications requiring uniformity in load distribution. Examples of such applications include a mattress or cushion for preventing bedsores occurring in bedridden patients, a transfer film that can provide uniform contact pressure to devices in a device transfer process, a control unit for passive load control or passive pressure control, and the like.

In particular, taking a transfer film used in a device transfer process as an example, production equipment used in semiconductor processes, flexible electronics processes, display processes, MEMS processes, LED processes, solar cell processes, and the like requires an apparatus for transferring thin film-type devices. A thin-film device used in flexible electronic products is required to have a very small thickness to be flexibly bent. In general, it is known that a monocrystalline silicon thin-film device is required to have a thickness of 5 μm or less to be bent to a curvature of 0.5 mm diameter when assumed to have a fracture strain of 1%.

For typical thick devices, a transfer process including picking and placing is performed using vacuum chuck technology. However, when applied to thin devices, the vacuum chuck technology has a problem in that the devices can be damaged due to pressure generated by a vacuum chuck. Accordingly, vacuum chuck technology is generally inapplicable to thin-film devices having a thickness of 5 μm or less.

In addition, there is a method of transferring devices using an electrostatic chuck. However, when applied to thin devices, this method has a problem in that the devices can be damaged due to static electricity.

For the above reasons, technology of attaching or transferring ultra-thin devices using van der Waals force acting on a nanoscale is known in the related art. In particular, a transfer apparatus capable of controlling van der Waals force is used to transfer thin-film devices. However, if the transfer apparatus has a very hard surface, good contact between the transfer apparatus and thin-film devices cannot be established due to a slight thickness difference between the devices, a curvature of a substrate, and the like, making it impossible to achieve adhesion of the devices to the transfer apparatus and transfer of the devices by the transfer apparatus. Therefore, a transfer apparatus manufactured using a material having a very low elastic modulus, for example, a polymer or rubber, is used to transfer such thin-film devices. One example of such a transfer apparatus is a flexible stamp.

In general, transfer apparatuses may be classified into a roll type and a plate type.

In the roll-type transfer apparatus, a roller is disposed on a substrate. Here, the roller is provided on an outer circumferential surface thereof with an adhesive layer to which micro-devices to be transferred to the substrate are adhesively attached.

In the plate-type transfer apparatus, a pressure plate is disposed on a substrate. Here, the pressure plate is provided on a lower surface thereof with an adhesive layer to which micro-devices to be transferred to the substrate are adhesively attached.

In the roll-type transfer apparatus or the plate-type transfer apparatus, it is important to allow uniform contact pressure to be applied between the adhesive layer and multiple micro-devices in order to ensure that the multiple micro-devices are picked from a source substrate onto the adhesive layer or that the multiple micro-devices adhesively attached to the adhesive layer are placed on a target substrate.

However, it can be difficult to provide uniform contact pressure between the adhesive layer and the micro-devices due to tolerances for the transfer apparatus, such as machining errors of the roller or the pressure plate and assembly tolerances, uneven heights of the micro-devices, warpage of the substrate, and the like.

Then, a micro-device at a location where insufficient contact pressure is applied cannot be properly transferred, whereas a micro-device at a location where excessive pressure is applied can be compressed and damaged.

Therefore, there is a need for technology that can solve non-uniformity of contact pressure distribution due to various errors.

DISCLOSURE

Technical Problem

Embodiments of the present invention are conceived to solve such problems in the art and it is an object of the present invention to provide a metastructure having a zero elastic modulus zone, which can experience constant stress in a predetermined strain zone, and a method for designing the same.

It will be understood that objects of the present invention are not limited to the above. The above and other objects of the present invention will become apparent to those skilled in the art from the detailed description of the following embodiments in conjunction with the accompanying drawings

Technical Solution

In accordance with one aspect of the present invention, a metastructure having a zero elastic modulus zone includes: a first unit having a structure capable of buckling and having a stress-strain relation having a zone corresponding to a negative elastic modulus; and a second unit disposed adjacent to the first unit and having a stress-strain relation having a zone corresponding to a positive elastic modulus, the metastructure having zero elastic modulus in a predetermined target strain zone through synthesis of the negative elastic modulus of the first unit with the positive elastic modulus of the second unit.

In one embodiment, the first unit may include: a first upper frame extending horizontally; a first lower frame extending horizontally and spaced apart from the first upper frame; and a pair of first support frames each connected at an upper end thereof to the first upper frame and connected at a lower end thereof to the first lower frame, a distance between the pair of first support frames increasing toward the first lower frame such that the pair of first support frames buckles upon application of compressive load.

In one embodiment, the first unit may further include: a slit formed through the first support frame and extending in a longitudinal direction of the first support frame.

In one embodiment, the second unit may include: a second upper frame connected to the first upper frame and extending horizontally; a second lower frame connected to the first lower frame and extending horizontally; and a pair of second support frames each connected at an upper end thereof to the second upper frame and connected at a lower end thereof to the second lower frame, a distance between the pair of second support frames increasing toward centers thereof such that the pair of second support frames is deformed without buckling upon application of compressive load.

In one embodiment, the first upper frame may be integrally formed with the second upper frame, and the first lower frame may be integrally formed with the second lower frame.

In one embodiment, the first unit and the second unit may be formed of the same material.

In one embodiment, the metastructure may include multiple metastructures arranged on a virtual plane, and the first unit and the second unit may be alternately arranged to be adjacent to each other.

In one embodiment, the first unit and the second unit may be stacked in multiple layers.

In accordance with another aspect of the present invention, a method for designing a metastructure having a zero elastic modulus zone includes: a first unit formation step in which a first unit is formed, the first unit having a structure capable of buckling and having a stress-strain relation having a zone corresponding to a negative elastic modulus; a second unit formation step in which a second unit is formed, the second unit being disposed adjacent to the first unit and having a stress-strain relation having a zone corresponding to a positive elastic modulus; and a compensation step in which the negative elastic modulus of the first unit is synthesized with the positive elastic modulus of the second unit such that the metastructure has zero elastic modulus in a predetermined target strain zone.

In one embodiment, in the compensation step, when an elastic modulus profile obtained through synthesis of the negative elastic modulus of the first unit with the positive elastic modulus of the second unit has a slope greater than zero in the target strain zone, an adjustment may be made to increase an absolute value of the negative elastic modulus of the first unit or to reduce an absolute value of the positive elastic modulus of the second unit.

In one embodiment, the first unit may include first upper and lower frames each extending horizontally and vertically spaced apart from each other and a first support frame connected at an upper end thereof to the first upper frame and connected at a lower end thereof to the first lower frame, the first support frame buckling upon application of compressive load; the second unit may include a second upper frame connected to the first upper frame and extending horizontally, a second lower frame connected to the first lower frame and extending horizontally, and a second support frame connected at an upper end thereof to the second upper frame and connected at a lower end thereof to the second lower frame, the second support frame being deformed without buckling upon application of compressive load; and, in the compensation step, when an elastic modulus profile obtained through synthesis of the negative elastic modulus of the first unit with the positive elastic modulus of the second unit has a slope greater than zero in the target strain zone, an adjustment may be made to reduce lengths of the first upper frame and the first lower frame or to increase lengths of the second upper frame and the second lower frame.

In one embodiment, the first unit may include first upper and lower frames each extending horizontally and vertically spaced apart from each other and a first support frame connected at an upper end thereof to the first upper frame and connected at a lower end thereof to the first lower frame, the first support frame buckling upon application of compressive load; the second unit may include a second upper frame connected to the first upper frame and extending horizontally, a second lower frame connected to the first lower frame and extending horizontally, and a second support frame connected at an upper end thereof to the second upper frame and connected at a lower end thereof to the second lower frame, the second support frame being deformed without buckling upon application of compressive load; and, in the compensation step, when an elastic modulus profile obtained through synthesis of the negative elastic modulus of the first unit with the positive elastic modulus of the second unit has a slope greater than zero in the target strain zone, an adjustment may be made to increase thicknesses of the first upper frame and the first lower frame or to reduce thicknesses of the second upper frame and the second lower frame.

Advantageous Effects

According to embodiments of the present invention, a metastructure having a zero elastic modulus zone includes a first unit having a stress-strain relation having a zone corresponding to a negative elastic modulus and a second unit having a stress-strain relation having a zone corresponding to a positive elastic modulus. The metastructure can have zero elastic modulus in a predetermined target strain zone through synthesis of the negative elastic modulus of the first unit with the positive elastic modulus of the second unit. Accordingly, the metastructure can provide uniform adhesion pressure to all devices to be transferred even when each of the devices applies a different amount of pressure to the metastructure due to various factors.

It will be understood that advantageous effects of the present invention are not limited to the above and include any advantageous effects conceivable from the features disclosed in the detailed description of the present invention or the appended claims.

LIST OF REFERENCE NUMERALS

Figure 1:
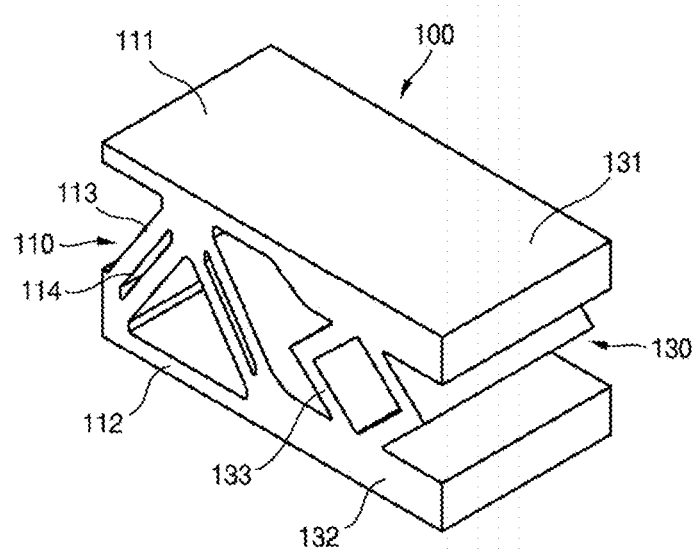
FIG. 1 is a perspective view of a metastructure having a zero elastic modulus zone according to one embodiment of the present invention.

100: Metastructure having zero elastic modulus zone
110: First unit
111: First upper frame
112: First lower frame
113: First support frame
114: Slit
130: Second unit
131: Second upper frame
132: Second lower frame
133: Second support frame

BEST MODE

Reference will now be made in detail to various embodiments, examples of which are illustrated in the accompanying drawings. It should be understood that the present invention may be embodied in different ways and is not limited to the following embodiments. In the drawings, portions irrelevant to the description will be omitted for clarity. Like components will be denoted by like reference numerals throughout the specification.

Throughout the specification, when an element or layer is referred to as being "on", "connected to", or "coupled to" another element or layer, it may be directly on, connected to, or coupled to the other element or layer or intervening elements or layers may be present. In addition, unless stated otherwise, the term "includes" should be interpreted as not excluding the presence of other components than those listed herein.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises", "comprising", "includes", and/or "including" when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, embodiments of the present invention will be described with reference to the accompanying drawings.

Figure 2:
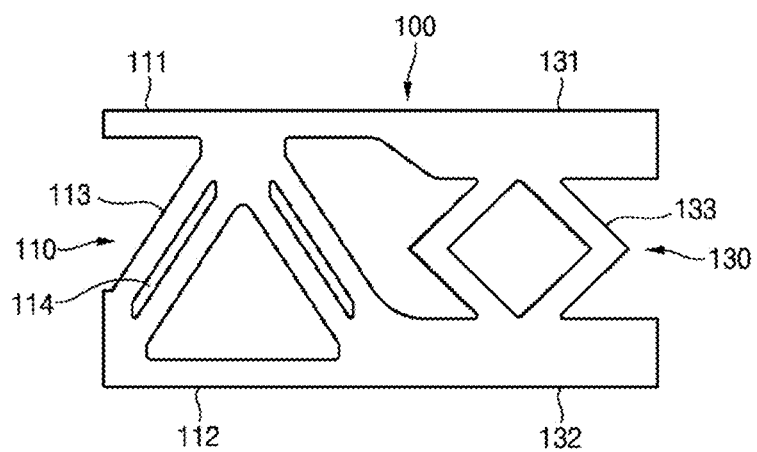
FIG. 2 is a front view of the metastructure of FIG. 1.

FIG. 1 is a perspective view of a metastructure having a zero elastic modulus zone according to one embodiment of the present invention, and FIG. 2 is a front view of the metastructure of FIG. 1.

Referring to FIG. 1 and FIG. 2, a metastructure 100 having a zero elastic modulus zone may include a first unit 110 and a second unit 130.

The first unit 110 may have a structure capable of buckling and may have a stress-strain relation having a zone corresponding to a negative elastic modulus.

Figure 3:
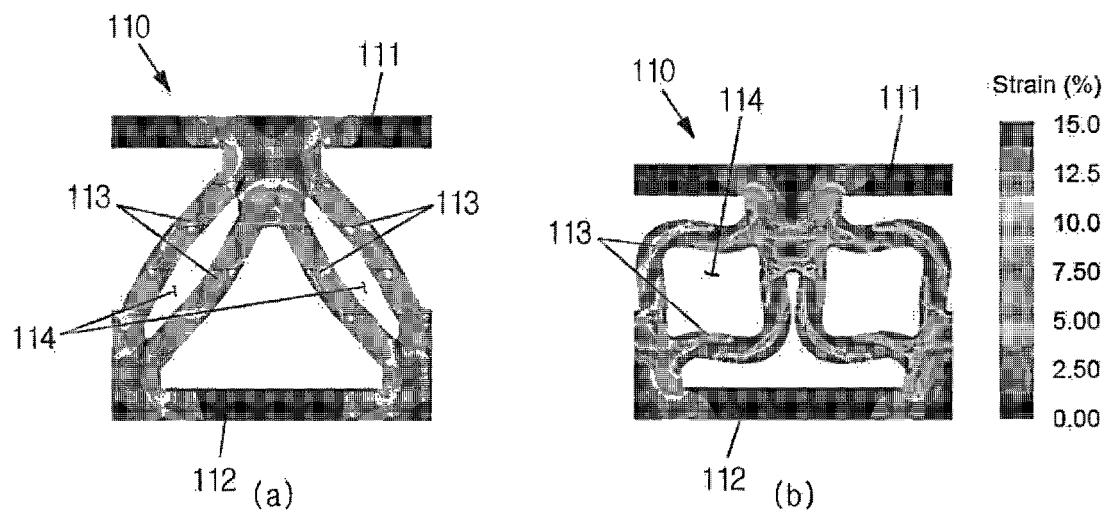
FIG. 3 shows a view illustrating deformation of a first unit of FIG. 1 and a graph of the resulting stress-strain relation.

FIG. 3 shows a view illustrating deformation of the first unit of FIG. 1 and a graph of the resulting stress-strain relation. In the following description, reference will further be made to FIG. 3.

Referring further to FIG. 3, the first unit 110 may have a first upper frame 111, a first lower frame 112, and a first support frame 113.

The first upper frame 111 may extend horizontally.

The first lower frame 112 may extend horizontally and may be spaced apart from the first upper frame 111.

The first support frame 113 may be disposed between the first upper frame 111 and the first lower frame 112. The first support frame 113 may be connected at an upper end thereof to the first upper frame 111 and may be connected at a lower end thereof to the first lower frame 112.

The first support frame 113 may have any structure including one or more first support frames so long as the structure is able to buckle. In this embodiment, the first support frame 113 may include a pair of first support frames, the distance between which increases toward the first lower frame 112.

As shown in FIG. 3(a), when a vertically downward compressive load begins to be applied to the first upper frame 111, the first support frame 113 is deformed. During a certain period of time after application of the compressive load, for which the first support frame 113 is deformed, a zone corresponding to a positive elastic modulus PEM appears in the stress-strain relation, as shown in FIG. 3(c). Here, a positive elastic modulus PEM indicates a positive slope of the stress-strain curve.

Then, when a critical buckling load CS is reached, buckling occurs in the first support frame 113 (see FIG. 3(b)). From this point on, the first unit has a negative elastic modulus in a zone ranging from a first strain E1, that is, a strain upon application of the critical buckling load CS, to a second strain E2. That is, the stress-strain curve has a negative slope, such that stress in the first unit decreases despite a continued increase in compressive load.

Beyond the zone corresponding to a negative elastic modulus NEM, the stress-strain curve may have a positive slope again if the first support frame 113 continues to be compressed. That is, beyond the second strain E2, a zone corresponding to a positive elastic modulus may appear again.

In addition, the first unit 110 may further include a slit 114. The slit 114 may be formed in the first support frame 113 and may extend in a longitudinal direction of the first support frame 113. The slit 114 may be formed through the first support frame 113. The slit 114 in the first support frame 113 can increase a length-to-cross-sectional area ratio of the first support frame 113, that is, slenderness of the first support frame 113, thereby allowing buckling to occur more stably in the first support frame 113.

The second unit 130 may be disposed adjacent to the first unit 110. The second unit 130 may have a stress-strain relation having a zone corresponding to a positive elastic modulus.

Figure 4:
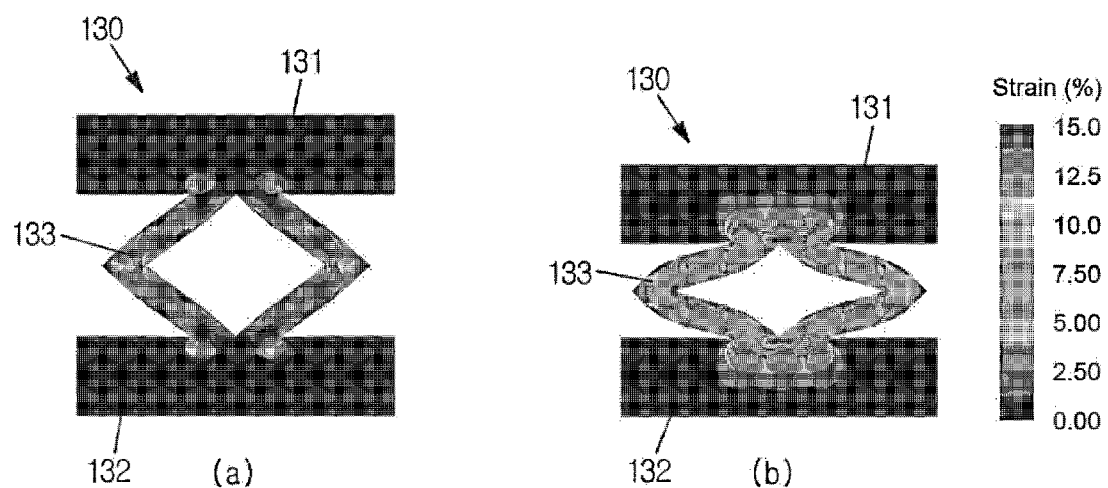
FIG. 4 shows a view illustrating deformation of a second unit of FIG. 1 and a graph of the resulting stress-strain relation.
Figure 4:
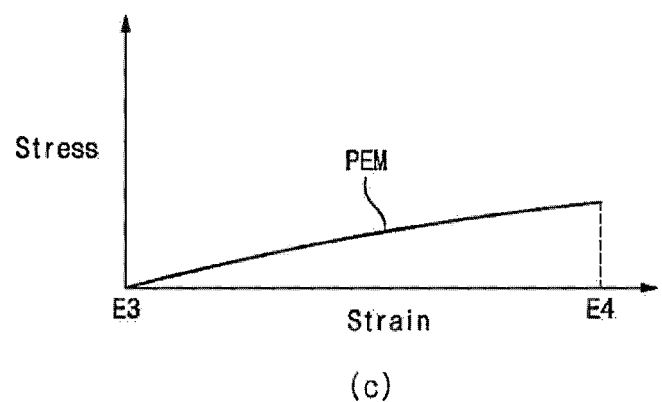

FIG. 4 shows a view illustrating deformation of the second unit of FIG. 1 and a graph of the resulting stress-strain relation. In the following description, reference will further be made to FIG. 4.

Referring further to FIG. 4, the second unit 130 may have a second upper frame 131, a second lower frame 132, and a second support frame 133.

The second upper frame 131 may be connected to the first upper frame 111 and may extend horizontally. The first upper frame 111 and the second upper frame 131 may be integrally formed with each other.

The second lower frame 132 may be connected to the first lower frame 112 and may extend horizontally. The second lower frame 132 may be spaced apart from the second upper frame 131. The first lower frame 112 and the second lower frame 132 may be integrally formed with each other.

The second support frame 133 may be disposed between the second upper frame 131 and the second lower frame 132. The second support frame 133 may be connected at an upper end thereof to the second upper frame 131 and may be connected at a lower end thereof to the second lower frame 132. The second support frame 133 may include a pair of second support frames, the distance between which increases toward centers thereof. Upon application of compressive load, the second support frame 133 may be deformed without buckling.

As shown in FIG. 4(a), when a vertically downward compressive load begins to be applied to the second upper frame 131, the second support frame 133 is deformed. During application of the compressive load to the second support frame 133, the second support frame 133 is deformed, but does not buckle (see FIG. 4(b)). Accordingly, as shown in FIG. 4(c), the second unit may have a stress-strain relation having a zone corresponding to a positive elastic modulus PEM.

Since the second unit 130 does not buckle, the second unit 130 has a positive elastic modulus in a zone ranging from a third strain E3, that is, a strain at the start of deformation, to a fourth strain E4. That is, the stress-strain curve has a positive slope, such that stress in the second unit increases as the compressive load increases.

Figure 5:
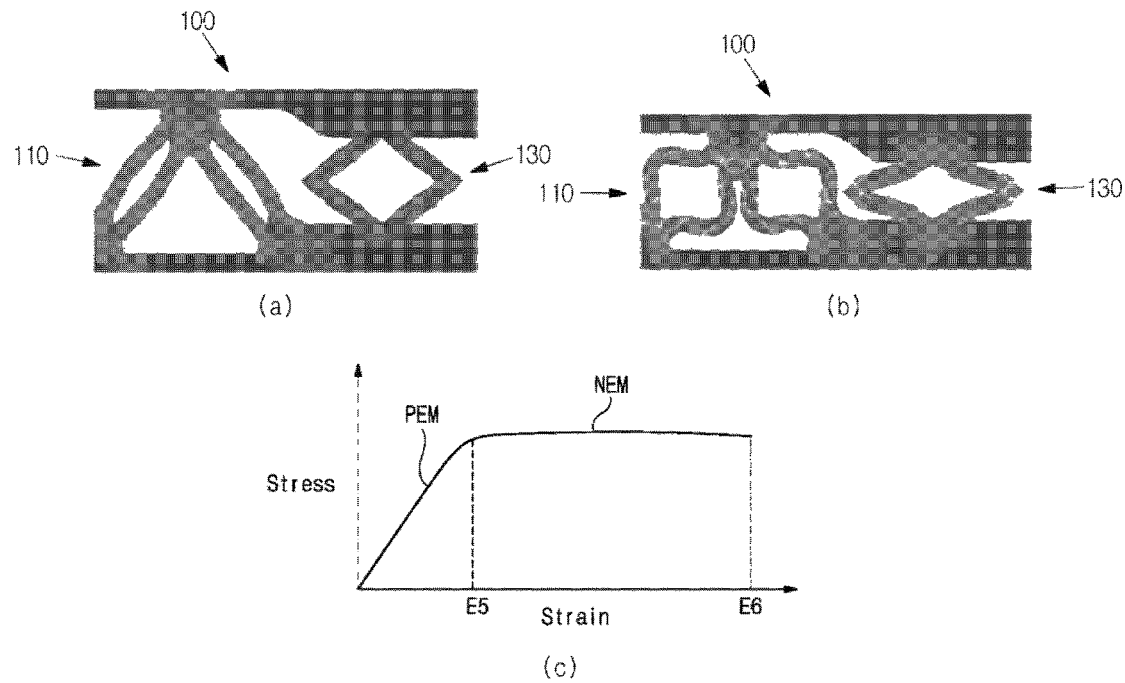
FIG. 5 shows a view illustrating deformation of the metastructure having the zero elastic modulus zone of FIG. 1 and a graph of the resulting stress-strain relation.

FIG. 5 shows a view illustrating deformation of the metastructure having the zero elastic modulus zone of FIG. 1 and a graph of the resulting stress-strain relation.

Referring to FIG. 5(a) and FIG. 5(b), upon application of compressive load to the metastructure 100 having the zero elastic modulus zone, an elastic modulus profile as shown in FIG. 5(c) may be produced through synthesis of a negative elastic modulus of the first unit 110 with a positive elastic modulus of the second unit 130. The metastructure having the synthesized elastic modulus profile may have a positive elastic modulus PEM from an initial strain, that is, a strain at the start of application of the compressive load, to a fifth strain E5, and may have zero elastic modulus ZEM from the fifth strain E5 to a sixth strain E6. Here, a zone ranging from the fifth strain E5 to the sixth strain E6 may be predetermined as a target strain zone. That is, a target strain zone, in which the metastructure can have zero elastic modulus ZEM, may be predetermined through appropriate design of the negative elastic modulus of the first unit 110 and the positive elastic modulus of the second unit 130. The target strain zone may be varied depending on devices to be transferred, the size thereof, adhesion pressure required for picking and placing the devices, and the like.

In the target strain zone, in which the metastructure has zero elastic modulus ZEM, the metastructure may have zero stiffness. In other words, a stress level at the fifth strain E5, which is the starting point of the target strain zone, can remain constant in the target strain zone.

Upon application of an external compressive load to the metastructure 100 having the zero elastic modulus zone, compressive stress generated in the metastructure 100 increases to a certain level S until the fifth strain E5 is reached. However, in the target strain zone ranging from the fifth strain E5 to the sixth strain E6, compressive stress in the metastructure 100 no longer increases and remains constant at the level S.

This means that, when an appropriate external compressive load is applied to the metastructure 100 having the zero elastic modulus zone such that the metastructure 100 is deformed only in the target strain zone, uniform adhesion pressure can be applied to devices to be transferred by the metastructure 100 having the zero elastic modulus zone.

Accordingly, even when there are factors making it difficult to apply uniform pressing force between an adhesive layer and micro-devices, such as tolerances for a transfer apparatus, such as machining errors of a roller or a pressure plate and assembly tolerances, uneven heights of the micro-devices, warpage of a substrate, and the like, uniform contact pressure can be applied to different devices to be transferred by providing an appropriate compressive load such that the metastructure 100 having the zero elastic modulus zone is deformed in the target strain zone.

Figure 6:
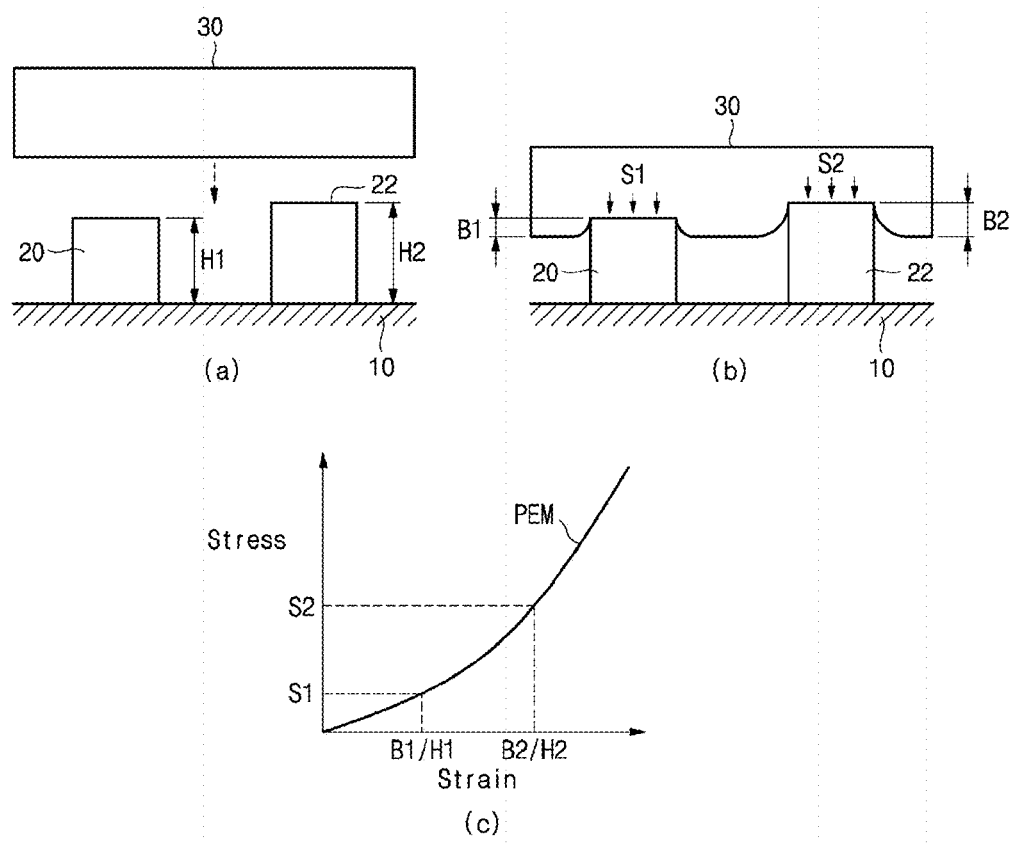
FIG. 6 is an exemplary view illustrating the relationship between strain and adhesion pressure in a conventional stamp.
Figure 7:
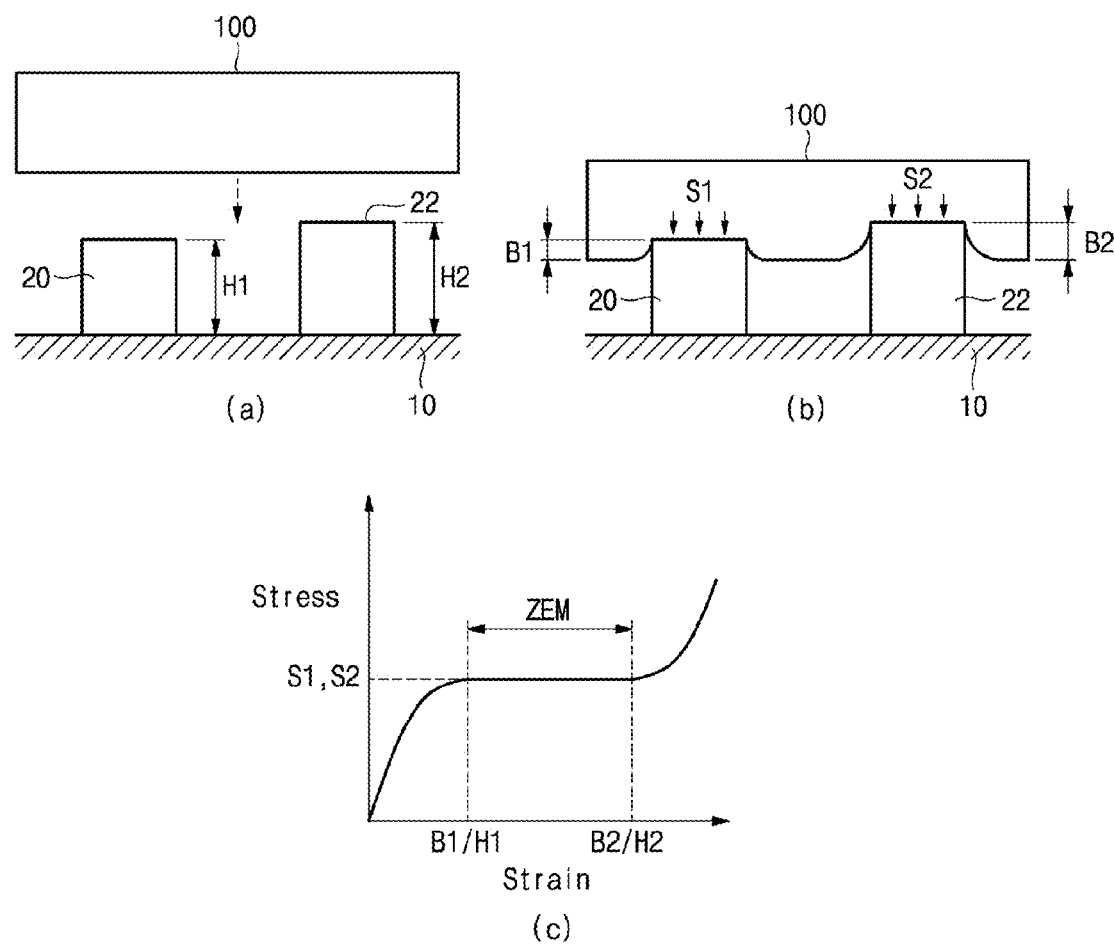
FIG. 7 is an exemplary view illustrating the relationship between strain and adhesion pressure in the metastructure having the zero elastic modulus zone of FIG. 1.

FIG. 6 is an exemplary view illustrating the relationship between strain and adhesion pressure in a conventional stamp, and FIG. 7 is an exemplary view illustrating the relationship between strain and adhesion pressure in the metastructure having the zero elastic modulus zone of FIG. 1.

First, in the case where multiple devices are picked from a substrate using a conventional stamp, if the multiple devices have the same height, strains of the stamp deformed by pressure applied by respective devices are equal to one another, such that the same level of stress is generated in each deformed portion of the stamp and the same amount of adhesion pressure is applied between the stamp and each of the devices.

However, if the height H2 of a second device 22 on the substrate 10 is greater than the height H1 of a first device 20 on the substrate 10 (see FIG. 6(a)), a strain B2 to which the stamp 30 is deformed by pressure applied by the second device 22 is greater than a strain B1 to which the stamp 30 is deformed by pressure applied by the first device 20. Then, stress S2 in a portion of the stamp 30 pressed by the second device 22 is greater than stress S1 in a portion of the stamp 30 pressed by the first device 20 (see FIG. 6(b)). Accordingly, the conventional stamp has a positive elastic modulus PEM in a stress-strain relation thereof (see FIG. 6(c)).

As a result, a large amount of force is locally applied to the second device 22, causing damage to the second device 22. Even so, reducing pressing force of the stamp 30 applied to the second device 22 to prevent this problem can result in insufficient contact pressure between the first device 20 and the stamp 30 or failure of the first device 20 to be brought into contact with the stamp 30, making it impossible to provide sufficient adhesion pressure to the first device 20.

Conversely, referring to FIG. 7, the metastructure 100 having the zero elastic modulus zone can allow stress S1 in a portion of the metastructure 100 pressed by the first device 20 to be equal to stress S2 in a portion of the metastructure 100 pressed by the second device 22 even when the height H2 of the second device 22 on the substrate 10 is greater than the height H1 of the first device 20 on the substrate 10 and thus a strain B2 of the metastructure 100 deformed by pressure applied by the second device 22 is greater than a strain B1 of the metastructure 100 deformed by pressure applied by the first device 20. That is, the metastructure 100 may have zero elastic modulus ZEM in a specific zone of the stress-strain relation. Accordingly, uniform adhesion pressure can be applied between the metastructure 100 having the zero elastic modulus zone and the different devices 20, 22.

The first unit 110 and the second unit 130 may be formed of the same material. The first unit 110 and the second unit 130 may be formed of a polymer, rubber, or the like.

Figure 8:
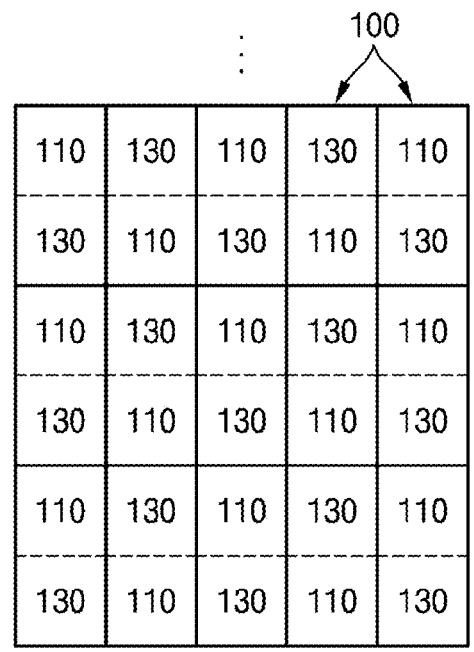
FIG. 8 is a diagram illustrating an example of parallel arrangement of metastructures each having a zero elastic modulus zone as shown in FIG. 1.

FIG. 8 is an exemplary diagram illustrating an example of parallel arrangement of metastructures each having a zero elastic modulus zone as shown in FIG. 1.

Referring to FIG. 8, multiple metastructures 100 each having a zero elastic modulus zone may be arranged in parallel on a virtual plane. Here, the first unit 110 and the second unit 130 may be alternately arranged to be adjacent to each other. In this way, through arrangement of the multiple metastructures in a plane, the metastructure 100 having the zero elastic modulus zone according to the present invention can be scaled up in area, and can be fabricated in the form of a film roll or sheet roll.

Next, a method for designing a metastructure having a zero elastic modulus zone will be described.

Figure 9:
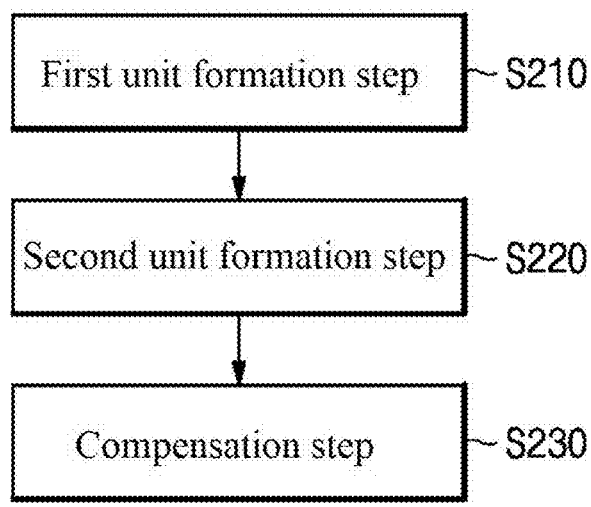
FIG. 9 is a flowchart of a method for designing a metastructure having a zero elastic modulus zone according to one embodiment of the present invention.

FIG. 9 is a flowchart of a method for designing a metastructure having a zero elastic modulus zone according to one embodiment of the present invention.

The method may include a first unit formation step S210, a second unit formation step S220, and a compensation step S230.

In the first unit formation step S210, a first unit is formed, wherein the first unit has a structure capable of buckling and has a stress-strain relation having a zone corresponding to a negative elastic modulus.

In the second unit formation step S220, a second unit is formed, wherein the second unit is disposed adjacent to the first unit and has a stress-strain relation having a zone corresponding to a positive elastic modulus.

In the compensation step S230, synthesis of the negative elastic modulus of the first unit with the positive elastic modulus of the second unit is performed such that the metastructure has zero elastic modulus in a predetermined target strain zone.

In the compensation step S230, if an elastic modulus profile obtained through synthesis of the negative elastic modulus of the first unit with the positive elastic modulus of the second unit has a slope of greater than zero in the target strain zone, the slope of the elastic modulus profile is compensated to zero by adjusting the elastic modulus of the first unit or the second unit or by adjusting the shape of the first unit or the second unit.

Figure 10:
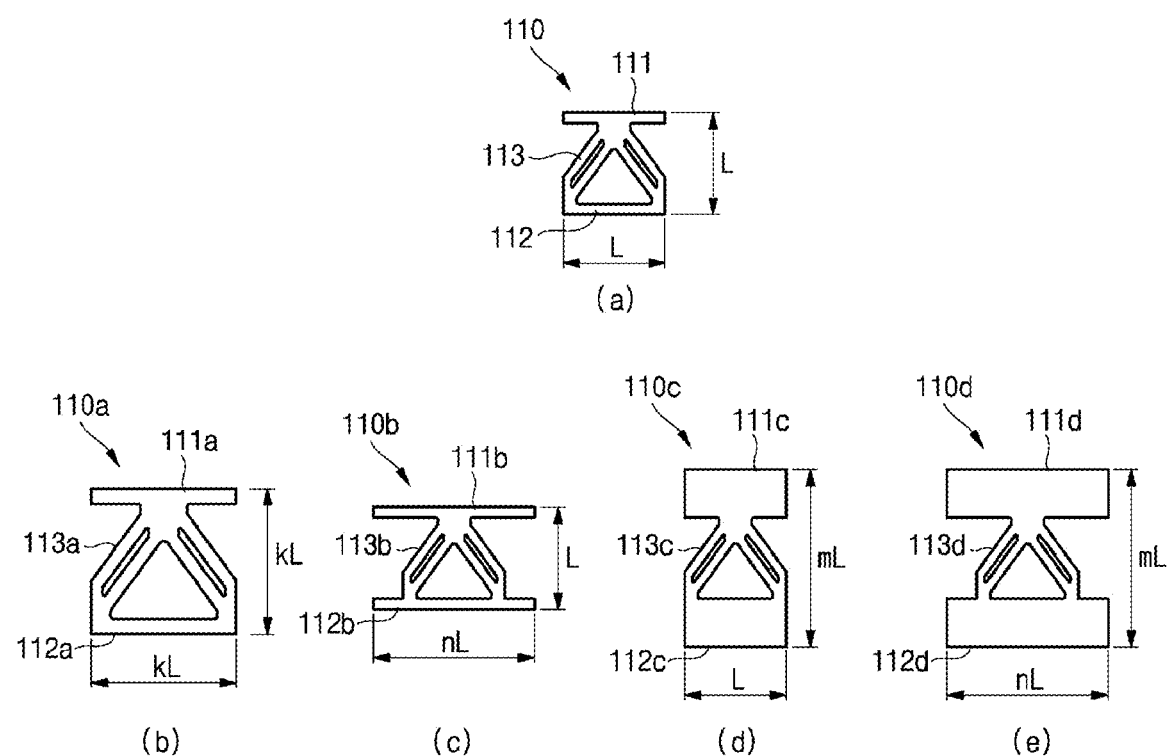
FIG. 10 is an exemplary view illustrating an example of shape adjustment of the first unit of FIG. 1.
Figure 11:
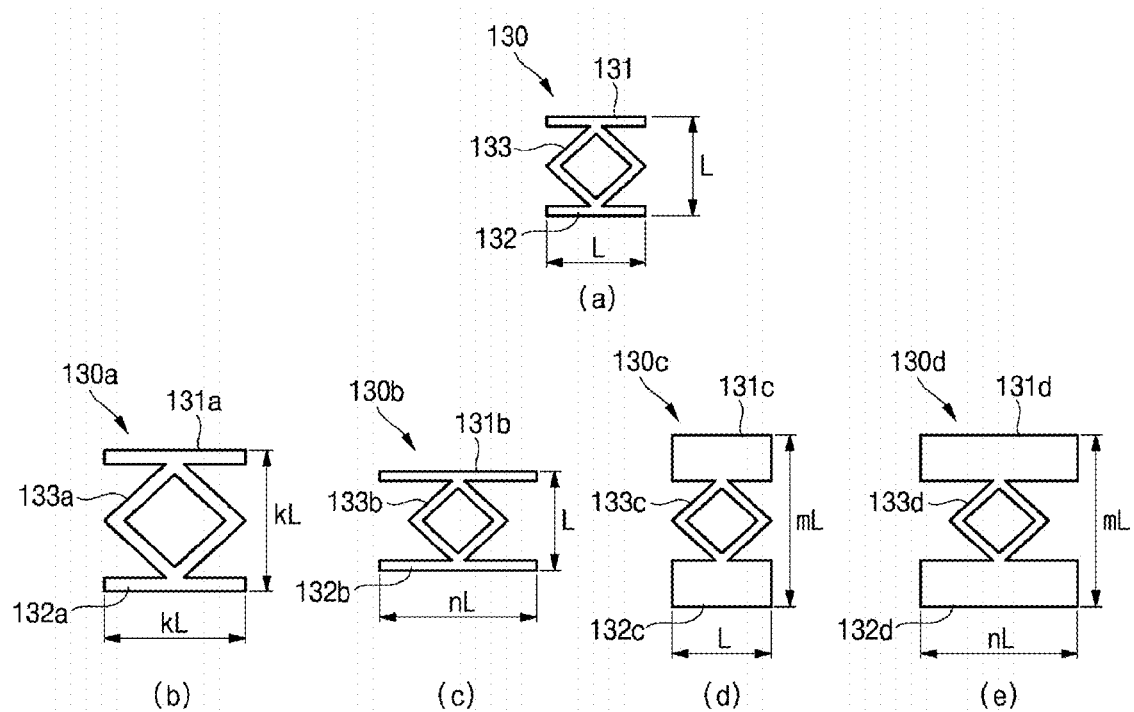
FIG. 11 is an exemplary view illustrating an example of shape adjustment of the second unit of FIG. 1.
Figure 12:
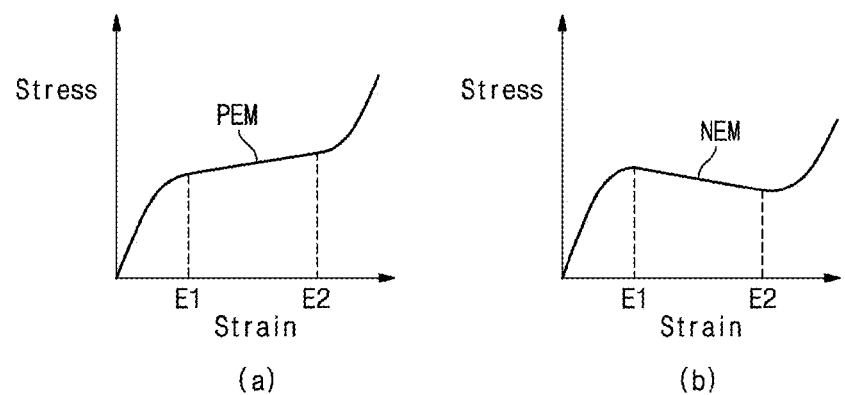
FIG. 12 is a graph describing a compensation step of FIG. 9.

FIG. 10 is an exemplary view illustrating an example of shape adjustment of the first unit of FIG. 1, FIG. 11 is an exemplary view illustrating an example of shape adjustment of the second unit of FIG. 1, and FIG. 12 is a graph describing the compensation step of FIG. 9.

First, when a first unit 110, the width and height of which have the same basic dimension L, is defined as a basic first unit, as shown in FIG. 10(a), the size and shape of the first unit 110 may be adjusted, as shown in FIG. 10(b) to FIG. 10(e).

Referring to FIG. 10(b), the basic first unit may be modified into a first unit 110a by increasing both the width and height thereof by k times the basic dimension L. Here, the lengths of a first upper frame 111a, a first lower frame 112a, and a first support frame 113a may be greater than the lengths of a first upper frame 111, a first lower frame 112, and a first support frame 113 of the basic first unit 110, respectively.

Alternatively, referring to FIG. 10(c), the basic first unit may be modified into a first unit 110b by increasing the width thereof by n times with the height thereof fixed to the basic dimension L. Here, the length of a first support frame 113b may be equal to the length of the first support frame 113 of the basic first unit 110, and the lengths of the first upper frame 111b and the first lower frame 112b may be n times the lengths of the first upper frame 111 and the first lower frame 112 of the basic first unit 110, respectively.

Alternatively, referring to FIG. 11(d), the basic first unit may be modified into a first unit 110c by increasing the height thereof by m times with the width thereof fixed to the basic dimension L. Here, the lengths of a first upper frame 111c, a first lower frame 112c, and a first support frame 113c may be equal to the lengths of the first upper frame 111, the first lower frame 112, and the first support frame 113 of the basic first unit 110, respectively, and the thicknesses of the first upper frame 111c and the first lower frame 112c may be greater than the thicknesses of the first upper frame 111 and the lower frame 112 of the first basic unit 110, respectively.

Alternatively, referring to FIG. 10(e), the basic first unit may be modified into a first unit 110d by increasing the width thereof by n times and increasing the length thereof by m times. Here, the length of a first support frame 113d may be equal to the length of the first support frame 113 of the first basic unit 110, the lengths of a first upper frame 111d and a first lower frame 112d may be n times the lengths of the first upper frame 111 and the first lower frame 112 of the basic first unit 110, respectively, and the thicknesses of the first upper frame 111d and the first lower frame 112d may be greater than the thicknesses of the first upper frame 111 and the first lower frame 112 of the basic first unit 110, respectively.

And, when a second unit 130, the width and height of which have the same basic dimension L, is defined as a basic second unit, as shown in FIG. 11(a), the size and shape of the second unit 130 may be adjusted, as shown in FIG. 11(b) to FIG. 11(e).

Referring to FIG. 11(b), the basic second unit may be modified into a second unit 130a by increasing both the width and height thereof by k times. Here, the lengths of a second upper frame 131a, a second lower frame 132a, and a second support frame 133a may be greater than the lengths of a second upper frame 131, a second lower frame 132, and a second support frame 133 of the basic second unit 130, respectively.

Alternatively, referring to FIG. 11(c), the basic second unit may be modified into a second unit 130b by increasing the width thereof by n times with the height thereof fixed to the basic dimension L. Here, the length of a second support frame 133b may be equal to the length of the second support frame 133 of the second basic unit 130, and the lengths of a second upper frame 131b and a second lower frame 132b may be n times the lengths of the second upper frame 131 and the second lower frame 132 of the basic second unit 130, respectively.

Alternatively, referring to FIG. 11(d), the basic second unit may be modified into a second unit 130c by increasing the height thereof by m times with the width thereof fixed to the basic dimension L. Here, the lengths of a second upper frame 131c, a second lower frame 132c, and a second support frame 133c may be equal to the lengths of the second upper frame 131, the second lower frame 132, and the second support frame 133 of the basic second unit 130, respectively, and the thicknesses of the second upper frame 131c and the second lower frame 132c may be greater than the thicknesses of the second upper frame 131 and the second lower frame 132 of the basic second unit 130, respectively.

Alternatively, referring to FIG. 11(e), the basic second unit may be modified into a second unit 130d by increasing the width thereof by n times and increasing the height thereof by m times. Here, the length of a second support frame 133d may be equal to the length of the second support frame 133 of the basic second unit 130, the lengths of a second upper frame 131d and a second lower frame 132d may be n times the lengths of the second upper frame 131 and the second lower frame 132 of the basic second unit 130, respectively, and the thicknesses of the second upper frame 131d and the second lower frame 132d may be greater than the thicknesses of the second upper frame 131 and the second lower frame 132 of the basic second unit 130, respectively.

When an elastic modulus profile obtained through synthesis of the negative elastic modulus of the first unit with the positive elastic modulus of the second unit has a slope greater than zero in the target strain zone ranging from a first strain E1 to a second strain E2, as shown in FIG. 12(a), that is, when the metastructure has a positive elastic modulus PEM in the target strain zone, in the compensation step S230, an adjustment may be made to increase the absolute value of the negative elastic modulus of the first unit or to reduce the absolute value of the positive elastic modulus of the second unit.

Alternatively, when the elastic modulus profile obtained through synthesis of the negative elastic modulus of the first unit with the positive elastic modulus of the second unit has a slope greater than zero in the target strain zone ranging from the first strain E1 to the second strain E2, in the compensation step S230, an adjustment may be made to reduce the lengths of the first upper frame and the first lower frame or to increase the lengths of the second upper frame and the second lower frame.

Alternatively, when the elastic modulus profile obtained through synthesis of the negative elastic modulus of the first unit with the positive elastic modulus of the second unit has a slope greater than zero in the target strain zone ranging from the first strain E1 to the second strain E2, in the compensation step S230, an adjustment may be made to increase the thicknesses of the first upper frame and the first lower frame or to reduce the thicknesses of the second upper frame and the second lower frame. In this way, the synthesized elastic modulus profile can have a slope of zero. That is, the metastructure can have zero elastic modulus in the target strain zone.

When the elastic modulus profile obtained through synthesis of the negative elastic modulus of the first unit with the positive elastic modulus of the second unit has a slope smaller than zero in the target strain zone ranging from the first strain E1 to the second strain E2, as shown in FIG. 12(b), that is, when the metastructure has a negative elastic modulus NEM in the target strain zone, in the compensation step S230, an adjustment may be made to reduce the absolute value of the negative elastic modulus of the first unit or to increase the absolute value of the positive elastic modulus of the second unit. Alternatively, an adjustment may be made to increase the lengths of the first upper frame and the first lower frame or to reduce the lengths of the second upper frame and the second lower frame. Alternatively, an adjustment may be made to reduce the thicknesses of the first upper frame and the first lower frame or to increase the thicknesses of the second upper frame and the second lower frame. In this way, the synthesized elastic modulus profile can have a slope of zero. That is, the metastructure can have zero elastic modulus in the target strain zone.

Figure 13:
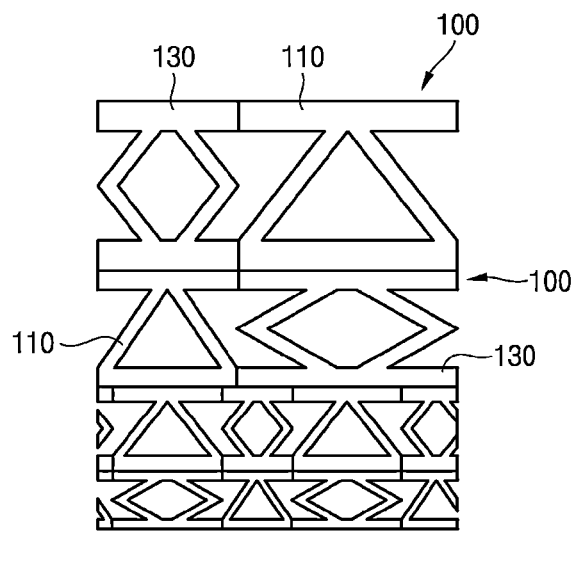
FIG. 13 shows an exemplary view of a serial array of metastructures each having a zero elastic modulus zone as shown in FIG. 1 and a graph of the resulting stress-strain relation.
Figure 13:
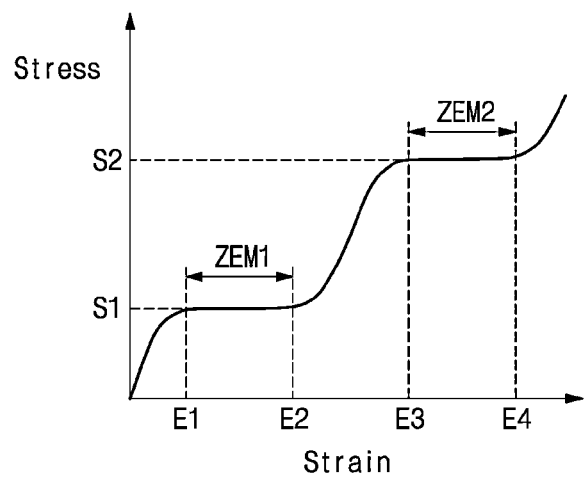

FIG. 13 shows an exemplary view of a serial array of metastructures each having a zero elastic modulus zone as shown in FIG. 1 and a graph of the resulting stress-strain relation. In FIG. 13(a), a simplified shape of the metastructure is shown.

Referring to FIG. 13, multiple metastructures 100 each having a zero elastic modulus zone may be vertically arranged in series. That is, the multiple metastructures 100 may be stacked in multiple layers along the axis of load application. In the serial array, the first unit 110 and the second unit 130 may be arranged in any suitable relationship with respect to each other. In the serial array, the size and shape of the metastructure 100 may be varied from layer to layer. Then, the amount of displacement of the metastructure 100 may be different from layer to layer although the amount of load applied to the metastructure 100 is the same for every layer. In this way, the serial array of the metastructures can have zero elastic modulus ZEM1/ZEM2, that is, can experience constant stress S1/S2, in multiple strain zones, that is, a strain zone ranging from a first strain E1 to a second strain E2 and a strain zone ranging from a third strain E3 to a fourth strain E4.

Although the metastructure has been described as being a transfer film used for device transfer for convenience, the metastructure may be used in various applications requiring uniformity in load distribution, including a mattress or cushion for preventing bedsores occurring in bedridden patients, a control unit for passive load control or passive pressure control, and the like.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. For example, components described as implemented separately may also be implemented in combined form, and vice versa.

The scope of the present invention is indicated by the following claims and all changes or modifications derived from the meaning and scope of the claims and equivalents thereto should be construed as being within the scope of the present invention.

The invention claimed is:

1. A metastructure having a zero elastic modulus zone, the metastructure comprising:
   a first unit having a structure capable of buckling and having a stress-strain relation having a zone corresponding to a negative elastic modulus; and
   a second unit disposed adjacent to the first unit and having a stress-strain relation having a zone corresponding to a positive elastic modulus,
   the metastructure having zero elastic modulus in a predetermined target strain zone through synthesis of the negative elastic modulus of the first unit with the positive elastic modulus of the second unit,
   wherein the first unit comprises:
   a first upper frame extending horizontally;
   a first lower frame extending horizontally and spaced apart from the first upper frame; and
   a pair of first support frames each connected at an upper end thereof to the first upper frame and connected at a lower end thereof to the first lower frame, a distance between the pair of first support frames increasing toward the first lower frame such that the pair of first support frames buckles upon application of compressive load.

2. The metastructure according to claim 1, wherein the first unit further comprises: a slit formed through the first support frame and extending in a longitudinal direction of the first support frame.

3. The metastructure according to claim 1, wherein the second unit comprises:
   a second upper frame connected to the first upper frame and extending horizontally;
   a second lower frame connected to the first lower frame and extending horizontally; and
   a pair of second support frames each connected at an upper end thereof to the second upper frame and connected at a lower end thereof to the second lower frame, a distance between the pair of second support frames increasing toward centers thereof such that the pair of second support frames is deformed without buckling upon application of compressive load.

4. The metastructure according to claim 3, wherein the first upper frame is integrally formed with the second upper frame and the first lower frame is integrally formed with the second lower frame.

5. The metastructure according to claim 1, wherein the first unit and the second unit are formed of the same material.

6. The metastructure according to claim 1, wherein the metastructure comprises multiple metastructures arranged on a virtual plane, and the first unit and the second unit are alternately arranged to be adjacent to each other.

7. A metastructure having a zero elastic modulus zone, the metastructure comprising:
   a first unit having a structure capable of buckling and having a stress-strain relation having a zone corresponding to a negative elastic modulus; and
   a second unit disposed adjacent to the first unit and having a stress-strain relation having a zone corresponding to a positive elastic modulus,
   the metastructure having zero elastic modulus in a predetermined target strain zone through synthesis of the negative elastic modulus of the first unit with the positive elastic modulus of the second unit,
   wherein the metastructure comprises multiple metastructures arranged on a virtual plane, and the first unit and the second unit are alternately arranged to be adjacent to each other, and
   wherein the first unit and the second unit are stacked in multiple layers.

* * * * *